HIGH SPEED LINE SPLITTER FOR MARKET QUOTATION APPARATUS

Filed June 15, 1964 2 Sheets-Sheet 1

INVENTORS
JOHN R. SCANTLIN,
EVAN J. DRUMMOND,
MICHAEL T. GRAY,
REAMAN PAUL NIQUETTE
BY THEIR ATTORNEYS
HARRIS, KIECH, RUSSELL & KERN

HIGH SPEED LINE SPLITTER FOR MARKET QUOTATION APPARATUS

Filed June 15, 1964 2 Sheets-Sheet 2

INVENTORS
JOHN R. SCANTLIN,
EVAN J. DRUMMOND,
MICHAEL T. GRAY,
REAMAN PAUL NIQUETTE
BY THEIR ATTORNEYS
HARRIS, KIECH, RUSSELL & KERN 3,312,952

HIGH SPEED LINE SPLITTER FOR MARKET QUOTATION APPARATUS

John R. Scantlin, Los Angeles, Evan J. Drummond, Woodland Hills, Michael T. Gray, Los Angeles, and Reaman Paul Niquette, Palos Verdes Estates, Calif., assignors to Scantlin Electronics, Inc., Los Angeles, Calif., a corporation of Delaware Filed June 15, 1964, Ser. No. 374,889
7 Claims. (Cl. 340—172.5)

This invention relates to market quotation equipment and, in particular, to apparatus for providing specific information on specific goods to a remotely located customer in response to specific inquiries of the customer. The present application is directed to an improvement on the apparatus described in our copending application "Market Quotation Apparatus," Ser. No. 319,231, filed Oct. 28, 1963.

In the market quotation apparatus of the invention, each customer is connected to a market data center by special equipment and conventional transmission lines which provide for transmission of customer inquiries to the data center and for transmission of messages from the data center to the customer in response to the inquiries. Reference may be made to said copending application for information on the over-all system. In such a system, the data center ordinarily will be in New York City and the customers will be concentrated in the major cities throughout the United States. With such an arrangement, transmission line charges are a major cost item and some form of line sharing is dictated. It is an object of the present invention to provide a new and improved transmission line splitting apparatus which permits handling on a high speed data line double the number of customers possible with the apparatus described in the aforesaid copending application.

It is an object of the present invention to provide a line splitter which may be incorporated in the high speed data line between the computer buffer at the data center and a pair of regional buffers which may be remote from each other with the line splitter permitting the handling of inquiries from the customers of both regional buffers and messages to the customers of both regional buffers on a single high speed line between the line splitter and the data center.

It is a particular object of the invention to provide such apparatus wherein the inquiries and messages are transmitted between regional and computer buffers in the form of digital words grouped into transmission frames with each frame having a plurality of even and odd time slots disposed sequentially and a synchronizing frame indicator time slot and including means for transmitting to the computer buffer in the even time slots inquiry words from one regional buffer and in the odd time slots inquiry words from the other regional buffer. A further object is to provide such apparatus in which one of the regional buffers may be connected to the line splitter via another high speed line with both lines operating at the same nominal transmission rate. An additional object is to provide such apparatus incorporating data handling and storage means in the line splitter for accommodating out-of-synchronization conditions of the two high speed lines while transmitting alternately in the odd and even time slots from the two regional buffers.

It is an object of the invention to provide such apparatus including similar equipment for handling messages from the data center to each of the regional buffers.

It is an object of the invention to provide in a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers in the form of digital words grouped into transmission frames with each frame having even and odd time slots and a synchronizing frame indicator time slot, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and including a word storage unit, a gate unit connected between one of the regional buffers and the word storage unit and including means for passing words from one regional buffer to the word storage unit during one of the even and odd time slots and rejecting words during the other time slots, and a switching unit having an output connected to the computer buffer and having the output of the word storage unit connected as one input and the other regional buffer connected as another input and including means for alternately selecting words from the word storage unit and the other regional buffer for transfer of the inquiry words from both regional buffers to the switching unit output.

It is a further object of the invention to provide such an apparatus in which the output from the switching unit is operated in synchronism with the output from the other regional buffer with the word storage unit providing for out-of-synchronism buffering between the one regional buffer and the output from the switching unit. An additional object is to provide such an apparatus in which the word storage unit has a plurality of storage zones with a word being transmitted sequentially from one zone to the next and with empty words being detected and discarded at the input of the storage unit. A further object is to provide such apparatus including means for inserting empty words in the output from the switching unit when inquiry words are not available.

The invention also comprises novel details of construction and novel combinations and arrangements of parts, which will more fully appear in the course of the following description. The drawings merely show and the description merely describes a preferred embodiment of the present invention which is given by way of illustration or example.

Figures 1, 3:
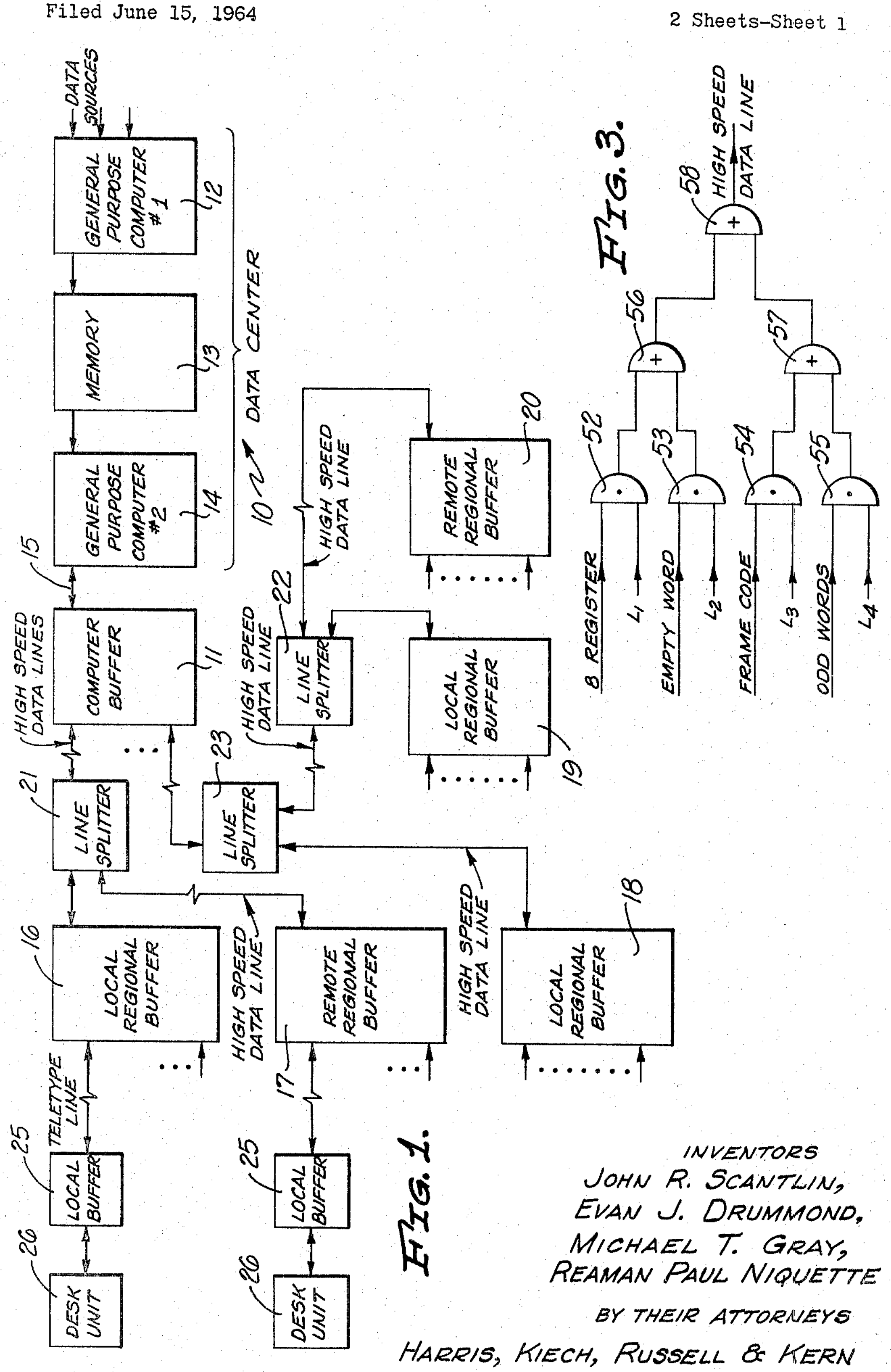
FIG. 1 is a block diagram illustrating the over-all apparatus.
FIG. 3 is a diagram illustrating a typical switching unit.

In the over-all system as shown in FIG. 1, a data center 10 and a computer buffer 11 are located at a spot adjacent the data sources, typically at or near New York City. The data center may comprise a general purpose computer 12, a memory 13, and a second general purpose computer 14. Data from the various markets and other sources are provided as inputs to the computer 12, which is programmed to handle the incoming data, select that which is desired, perform various calculations, and transfer the resultant information to the memory 13.

As an example, suppose one hundred shares of General Motors were sold at 57. This information is transferred from the New York Stock Exchange to the computer 12. The computer will check in the memory 13 and determine that the previous last sale was at 56¾. The computer will store a new last sale figure of 57 in the memory for GM and will also store an *up* signal in the tick from previous sale location of the memory. The computer will check to determine the high for the day for GM stored in the memory 13 and if less than 57, will change the figure to 57. The computer will also extract the cumulative volume for GM from the memory, add 100 to this figure and reinsert it in the memory. By this means, the data stored in the memory is continuously maintained current.

The second computer 14 is programmed to receive an inquiry from a customer, extract from the memory 13 the information necessary to respond to the inquiry, and transmit the message in response to the inquiry.

The computer buffer 11 is positioned adjacent the computer 14 and is connected thereto by a line 15. The apparatus includes a plurality of regional buffers such as 16–20. A regional buffer may be connected directly to the computer buffer 11 by a high speed data line, as in the aforementioned copending application. In an alternative arrangement, a pair of regional buffers 16, 17 may be connected to a line splitter 21 which in turn is connected to the computer buffer via a high speed data line. One of the regional buffers will normally be positioned adjacent the line splitter and will be identified as the local regional buffer while the other may be at a distance from the line splitter and connected thereto by another high speed data line. The regional buffer 18 and another line splitter 22 may be connected to the computer buffer through a line splitter 23, with the regional buffers 19 and 20 served through the line splitter 22. A regional buffer is installed at a location adjacent a plurality of customers, typically at a major city. The particular apparatus described in our copending application provided for up to eight regional buffers directly connected to the computer buffer by high speed data lines. The invention was not limited to this particular number of units and fewer or more regional buffers could be utilized. The present invention by utilization of line splitters permits operation with additional regional buffers without any increase in the number of high speed data line inputs to the computer buffer.

A plurality of customers are connected to each regional buffer, each customer being served by a separate teletype or telegraph line. Each customer is provided with a local buffer 25 and a desk unit 26.

The flow of information from a customer to the data center and from the data center to the customer will be described in conjunction with FIG. 1. Each customer desk unit is manually actuated by the customer to generate the inquiry. Each desk unit includes a plurality of manually actuable push buttons and a display mechanism, such as a printed tape carrying the message in response to the cutomer's inquiry.

A request for information is initiated by pressing buttons in sequence on the desk unit. Each button pushed results in information which is sent to the computer as a separate character. Every character is treated separately through the system for both directions of transmission.

As each button on the desk console is pressed, a five-bit character is encoded and sent to the local buffer or desk unit converter, in parallel form and is temporarily stored in a shift register. Upon receipt of the parallel information in the local buffer, a timing sequence is begun to shift the information out in serial form at a 100 words per minute data rate to the local central office or regional buffer via a standard unipolar telegraph line. The receiving portion of the local buffer simultaneously receives the character being sent and provides signals for the desk unit to cause the character to be printed.

When the character arrives at the regional buffer, it is temporarily stored in the customer's module. A separate circuit in the customer's module notifies the scanner of the regional buffer that a complete character has arrived as the scanner sweeps over the plurality of customers' modules looking for waiting characters. There may be up to 126 customers' modules in each regional buffer, each customer's module having a seven-bit binary address representing numerically customers 1, 2, 3, . . . 126. The scanner is a 128 count device with one address reserved for the empty word code and a second address reserved for future use.

When the scanner finds a waiting character in a customer module, a word is automatically set up for transmission to the computer buffer. The word consists of twelve bits and is divided into two parts or fields. The address field is transmitted first and consists of the seven-bit binary address of the customer. The character field follows and consists of the five bits which have been temporarily stored in the customer's module. The completed word is transmitted at a rate of 2,000 bits per second on the high speed data line to the computer buffer, with one word for each button pressed by the customer at the desk unit. At the end of every sixteenth word, a distinctive synchronizing code referred to as the frame code, is put on the transmission line to assist the computer buffer equipment in separating the words.

When the word arrives at the computer buffer, it is again temporarily stored in a line module. In the specific embodiment illustrated, there are eight input lines to the computer buffer. The incoming character from a particular line is held in temporary storage in hopes that a character will also arrive on another line. After the characters are held for the longest possible time, the computer is interrupted and the computer prepares itself to receive input. On demand of the computer, the words from the eight lines are given to the computer. The customers on a line are identified by their individual seven-bit number address and the lines are identified by their order of input. When the character arrives in the computer, it is examined and placed in a specific location in the computer memory reserved for that particular customer. This process is repeated until the entry of symbols is complete. The entry routine always ends with the pressing of a function button which defines the type of service or information desired. When the computer receives a code corresponding to one of these function buttons, it proceeds to look up the information desired and prepare an answer. For example, when a customer desires the last price of General Motors, he composes a four-character inquiry comprising a *start* function character, the character G, the character M, and a character corresponding to the function *last price*. The inquiry composition is achieved by pressing the push button marked *start*, then the button identified by the letter G, then the push button identified by the letter M, and then the push button marked *last price*, the characters G and M comprising the identification section of the inquiry and the fourth character comprising the function section. On receipt of this complete inquiry, the computer 14 will go to that portion of the memory 13 in which the last price of GM is stored and provide this data as the message to be returned to the customer.

The return information comprising the message follows the same path as the input information. On command of the computer interface equipment, the computer outputs twelve-bit words containing customers' addresses and characters. These words are interspersed with the synchronizing or frame code and sent out on the appropriate high speed line.

The regional buffer equipment synchronizes with the incoming information so as to separate it into words. The address portion of each word is decoded and used to select the correct customer's module. The character portion of each word is shifted to a buffer in the customer's module and sent to the local buffer via the same telegraph line that was used for the inquiry characters.

When the character is received at the local buffer, it is stored in a receive register for ultimate display to the customer as by printing or by lights.

Information is transmitted on the high speed data lines in twelve-bit words, each word comprising a seven-bit address and a five-bit character. If no inquiry or message is waiting during a particular word time, an empty word is transmitted. An empty word consists of an all-zero address and the character V, the zero address being restricted from use by the scanner for customers' modules, as indicated previously. The ones in the empty word character serve to break up the bit pattern thereby preventing long chains of all zeroes on the transmission line during idle conditions. Words are transmitted in groups called frames, each frame comprising sixteen words plus an eight-bit frame code providing a total of two hundred bits in each frame. The frame code serves as a synchronizing code. At 2,000 bits per second on the high speed line, a frame requires 0.1 second transmission time. The various figures given above have been selected for use in the equipment now in service but it should be kept in mind that these particular figures are arbitrary and that the invention may be utilized with other arrangements.

Figure 2:
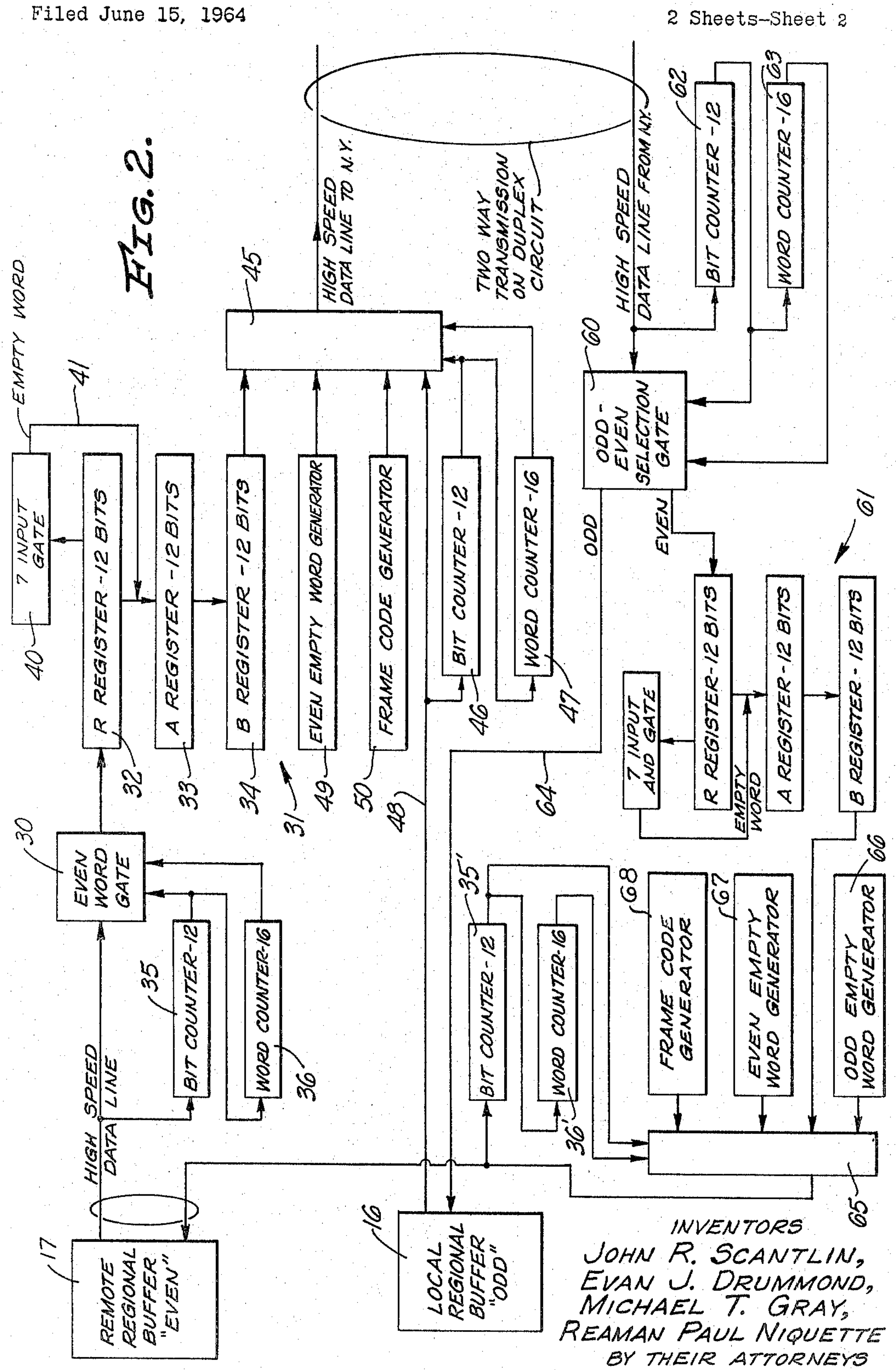
FIG. 2 is a diagram of the line splitter of the invention.

The word time slots within a transmission frame are referred to by number sequence 0 through 15, providing eight even-numbered slots and eight odd-numbered slots. With the present invention utilizing the line splitter, the even-numbered time slots are assigned to one regional buffer connected to a line splitter and the odd-numbered time slots are assigned to the other regional buffer connected to the line splitter. In the arrangement of FIG. 2, the remote regional buffer 17 is designated as the even regional buffer and the local regional buffer 16 is designated as the odd regional buffer. In the even regional buffer, the output switching logic is designated to transmit inquiry words only in the even time slots and to introduce empty words in the odd time slots. Similarly, in the odd regional buffer, the output switching logic is designed to transmit inquiry words only in the odd time slots and to introduce empty words in the even time slots.

Referring to FIG. 2, the line splitter includes an even word gate 30 and a word storage unit 31 having storage zones 32, 33, 34. A bit counter 35 provides a word signal at the end of each twelve counts for opening the gate 30 at the start of an even word in a frame and closing the gate at the start of an odd word. A word counter 36 provides a frame signal at the end of the sixteenth word to close the gate 30 during the frame code portion of the transmission frame. By this means, only the even words are transferred to the first register 32 of the word storage unit. The even words are inputted serially into the R register 32 and are block transferred to the A register 33 and then to the B register 34. A seven-input OR gate 40 has the first seven bits of the R register 32 as the input and provides an output signal on the line 41 for blocking transfer from the register 32 to the register 33 when the word stored in the register 32 is an empty word. By this means, the storage capacity of the word storage unit 31 is utilized only for inquiry words.

Information is transferred from a switching unit 45 of the line splitter to the high speed data line to the computer buffer 11. A bit counter 46 and a word counter 47 provide the word signals and frame signals for synchronizing the operation of the switching unit 45. The bit counter 46 may utilize various clock signals as an input and here operates with the clock on the line 48 from the regional buffer 16. Alternatively, word and frame signals may be obtained on a separate line direct from the regional buffer 16.

The switching unit acts to alternately transmit twelve-bit words from the register 34 of the word storage unit and from the regional buffer 16 onto the high speed data line, with the output of the register 34 connected during the even time slots and the output from the regional buffer 16 connected during the odd time slots. When there is no word ready for transmission from the register 34, a twelve-bit empty word is provided from an empty word generator 49 for transmission onto the high speed line. At the end of the sixteenth word in the frame, the eight-bit frame code comprising seven ones and a zero is generated at a frame code generator 50 for transmission on the high speed line. The switching unit may be a conventional multi-input gate circuit controlled by switching logic and may correspond to the unit 66 of our copending application. A typical arrangement is shown in FIG. 3 utilizing AND gates 52, 53, 54, 55, OR gates 56, 57 and OR gate 58. Even time slot words are provided from the B register through the gate 52, empty even words through the gate 53, the frame code through the gate 54, and words in the odd time slot through the gate 55. The switching logic determines which one of the four AND gates will be open or conducting during each time slot of the transmission frame.

The computer 14 at the data center keeps the inquiries from the even and odd time slots segregated. When a response is prepared by the computer for transmission to the customer, the output words are arranged to return on a particular high speed data line and during the even or the odd time slots corresponding to the inquiry. In the operation of the over-all system, the computer buffer operates as though it was directly connected to a regional buffer and the regional buffer operates as if it was directly connected to the computer buffer, with the line splitter providing for the combining of two regional buffers onto a single high speed line. This permits existing apparatus to have a line splitter installed therein to double the number of customers handled on a single high speed line without requiring additional equipment elsewhere in the system.

For handling data from the data center to the regional buffers, the line splitter also includes a selection gate 60 and a word storage unit 61 which may be identical to the word storage unit 31. Word and frame signals for controlling the selection gate 60 are provided by a bit counter 62 and a word counter 63 for transferring odd words on the line from New York during odd time slots to the local regional buffer 16 via line 64 and for transferring even words during the even time slots to the word storage unit 61. The frame code from New York may be blocked at the selection gate 60 or may be transferred on to the regional buffer 16 as desired.

The message return portion of the line splitter also includes a switching unit 65 which may be identical to the switching unit 45. During the even time slots in the transmission frame to the remote regional buffer 17, the switching unit 65 provides words from the B register of the word storage unit 61 and provides empty words from the odd empty word generator 66 during the odd time slots. If there is no word in the B register ready for transmission in an even time slot, an even empty word is provided from the generator 67. The frame code generator 68 provides the frame code for transmission at the end of the sixteenth word in the transmission frame. A bit counter 35' and a word counter 36' provide the word signals and frame signals using the clock of the line between the switching unit 65 and the buffer 17.

While all of the high speed data lines utilized in the quotation apparatus have the same nominal transmission rate, the various lines are not operated from a single master clock and hence will not be operating in synchronism. For example, information on the high speed data line between the remote regional buffer 17 and the line splitter 21 will not be in synchronism with the information on the high speed line between the line splitter 21 and the computer buffer 11. In contrast, information on the line between the local regional buffer 16 and the line splitter 21 can be synchronized with the information on the high speed line to New York because the proximity of the local regional buffer and the line splitter permits additional wire connections therebetween without significant cost increases. The difference in timing between the two inputs to the line splitter is taken care of by providing for direct transfer of odd words from the local regional buffer onto the New York line while providing for storage of the even words, preferably through a plurality of registers. The registers of the word storage unit provide for retention of information words from the remote regional buffer when the words are coming at a faster rate than from the local regional buffer. The blocking of odd words from the word storage unit and the discarding of empty even words provides periods of time for absorbing the time differences. The same operation is obtained in the storage unit 61 for transmitting information from the data center to the customers. It should be noted that while the system has been described herein with the even time slots assigned to the remote regional buffer and the odd time slots assigned to the local regional buffer, the reverse situation may be utilized. In another alternative arrangement, the selection gate 60 may be operated to pass the entire transmission frame to the local regional buffer while passing only the contents of the even time slots to the word storage unit 61. In this situation, the local regional buffer would require an additional gate unit for rejecting the contents of the even time slots.

As shown in FIG. 1, two line splitters 23, 22 may be utilized in a series arrangement to provide service from three regional buffers on a single high speed data line input to the computer buffer 11. The line splitter 23 will be identical to the line splitter 21, providing service to the local regional buffer 18 on one of the odd and even time slots and providing service on another high speed data line to the line splitter 22 on the other of the odd and even time slots. In the example given herein, the local regional buffer will utilize the odd time slots to be consistent with the previously described operation of the line splitter 21.

The line splitter 22 may be identical to the line splitters 21, 23 but the switching logic for the switching unit 45 will be slightly modified. Both the local regional buffer 19 and the remote regional buffer 20 will transmit information only in the even time slots and will transmit empty words in the odd time slots of the transmission frame in the same manner as the remote regional buffer 17. During the frame code period, the frame code generator will be connected to the high speed line, during the odd time slots, the empty word generator will be connected to the high speed line, and during the even time slots, the output from the word storage unit will be connected to the high speed line. When there is no inquiry word available at the word storage unit for transfer during the next even time slot, the output from the local regional buffer 19 will be transferred to the high speed line. In the message return section of the line splitter 22, the contents of the odd time slots are discarded and the contents of the even time slots are transmitted to both regional buffers 19 and 20. With this arrangement, duplicate customer addresses for the two regional buffers are not permitted. If desired, another line splitter could be inserted between the line splitter 23 and the regional buffer 18 to provide service to a fourth regional buffer on the single high speed line between the line splitter 23 and the computer buffer 11.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers in the form of digital words grouped into transmission frames with each frame having even and odd time slots and a synchronizing frame indicator time slot, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and including in combination:

a word storage unit, a gate unit connected between one of said regional buffers and said word storage unit and including means for passing words from said one regional buffer to said word storage unit during one of said even and odd time slots and rejecting words during the other of said time slots, and a switching unit having an output connected to said computer buffer and having the output of said word storage unit connected as one input and said other regional buffer connected as another input and including means for alternately selecting words from said word storage unit and from said other regional buffer for transfer of the inquiry words from both regional buffers to the switching unit output.

2. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers bit by bit in the form of digital words grouped into transmission frames with each frame having even and odd time slots and a synchronizing frame indicator time slot, each word having an address and a character, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and with each regional buffer transmitting empty words having no customer unit address when no inquiry is available for transmission, and including in combination:

a word storage unit, a gate unit connected between one of said regional buffers and said word storage unit and including means for passing words from said one regional buffer to said word storage unit during one of said even and odd time slots and rejecting words during the other of said time slots, control means having the address of a word in said word storage unit as an input for recognizing the presence of an empty word and blocking transfer of such empty word from said word storage unit, empty word means for generating an empty word, and a switching unit having an output connected to said computer buffer and having the output of said word storage unit connected as one input and said other regional buffer connected as another input and said empty word means as another input and including means for alternately selecting words from said word storage unit and from said other regional buffer for transfer of the inquiry words from both regional buffers to the switching unit output and for selecting empty words from said empty word means in lieu of words from said word storage unit when there is no inquiry word available in said word storage unit.

3. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquires to a regional buffer and messages to a customer unit, and a computer buffer having a high speed line input and output and a computer input and output for connection to the computer, with the inquiries and messages being transmitted between regional and computer buffers bit by bit in the form of digital words grouped into transmission frames with each frame having even and odd time slots and a synchronizing frame indicator time slot, each word having an address and a character, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and with each regional buffer transmitting empty words having no customer unit address when no inquiry is available for transmission, and including in combination:

a word storage unit, a gate unit connected between one of said regional buffers and said word storage unit and including means for passing words from said one regional buffer to said word storage unit during one of said even and odd time slots and rejecting words during the other of said time slots, control means having the address of a word in said word storage unit as an input for recognizing the presence of an empty word and blocking transfer of such empty word from said word storage unit, empty word means for generating an empty word, a switching unit having an output connected to said computer buffer and having the output of said word storage unit connected as one input and said other regional buffer connected as another input and said empty word means as another input and including means for alternately selecting words from said word storage unit and from said other regional buffer for transfer of the inquiry words from both regional buffers to the switching unit output and for selecting empty words from said empty word means in lieu of words from said word storage unit when there is no inquiry word available in said word storage unit, means for counting a predetermined number of bits at said switching unit to indicate the end of a word, means for counting a predetermined number of words at said switching unit to indicate the end of a word group, and means for generating a frame indicator in a digital code, with said switching unit including means for selecting said frame indicator for transfer to the switching unit output at the end of a word group to form a transmission frame.

4. In a market quotation apparatus having a memory unit including means for storing market information therein, a computer including means for looking up stored information in the memory unit and composing a message in response to an inquiry, the inquiry including an identification station and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to as a regional buffer and messages to a customer unit, and a computer buffer having a high speed line input and output and a computer input and output for connection to the computer, with the inquiries and messages being transmitted between regional and computer buffers bit by bit in the form of digital words grouped into transmission frames with each frame having even and odd time slots and a synchronizing frame indicator time slot, each word having an address and a character, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and with each regional buffer transmitting empty words having no customer unit address when no inquiry is available for transmission, and including in combination:

a word storage unit having a plurality of sequential storage zones each capable of storing a word and having means for transferring words from one storage zone to the next in sequence, a gate unit connected between one of said regional buffers and the first storage zone of said word storage unit and including means for passing words from said one regional buffer to said word storage unit during one of said even and odd time slots and rejecting words during the other of said time slots, control means having the address of a word in said first storage zone of said word storage unit as an input for recognizing the presence of an empty word and blocking transfer of such empty word to the next storage zone of said word storage unit, empty word means for generating an empty word, and a switching unit having an output connected to said computer buffer and having the output of the last storage zone of said word storage unit connected as one input and said other regional buffer connected as another input and said empty word means as another input and including means for alternately selecting words from said word storage unit and from said other regional buffer for transfer of the inquiry words from both regional buffers to the switching unit output and for selecting empty words from said empty word means in lieu of words from said word storage unit when there is no inquiry word available in said last storage zone of said word storage unit.

5. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers in the form of digital words grouped into transmission frames with each frame having even and odd time slots and a synchronizing frame indicator time slot, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and including in combination:

first and second word storage units, a first gate unit connected between one of said regional buffers and said first word storage unit and including means for passing words from said one regional buffer to said first word storage unit during one of said even and odd time slots and rejecting words during the other of said time slots, a second gate unit having an input connected to said computer buffer output and having odd and even outputs and including means for passing odd words from said computer buffer to said odd output and even words from said computer buffer to said even output and with the corresponding one of said odd and even outputs connected to said other regional buffer and the other of said odd and even outputs connected to said second word storage unit, a first switching unit having an output connected to said computer buffer and having the output of said first word storage unit connected as one input and said other regional buffer connected as another input and including means for alternately selecting words from said first word storage unit and from said other regional buffer for transfer of the inquiry words from both regional buffers to the switching unit output, empty word means for generating an empty word having no customer unit address, and a second switching unit having an output connected to said one regional buffer and having the output of said second word storage unit connected as one input and said empty word means connected as another input and including means for alternately selecting words from said second word storage unit and from said empty word means for transfer of message words from said second word storage unit to said one regional buffer only during one of said even and odd time slots.

6. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers bit by bit in the form of digital words grouped into transmission frames with each frame having even and odd time slots and a synchronizing frame indicator time slot, each word having an address and a character, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and including in combination:

first and second word storage units, a first gate unit connected between one of said regional buffers and said first word storage unit and including means for passing words from said one regional buffer to said first word storage unit during one of said even and odd time slots and rejecting words during the other of said time slots, a second gate unit having an input connected to said computer buffer output and having odd and even outputs and including means for passing odd words from said computer buffer to said odd output and even words from said computer buffer to said even output and with the corresponding one of said odd and even outputs connected to said other regional buffer and the other of said odd and even outputs connected to said second word storage unit, counting means for counting a predetermined number of bits at said second gate unit to indicate the end of a word and for counting a predetermined number of words to indicate the end of a word group, means for connecting said counting means to said second gate unit in controlling relation for actuating said gate unit at the end of each word, a first switching unit having an output connected to said computer buffer and having the output of said first word storage unit connected as one input and said other regional buffer connected as another input and including means for alternately selecting words from said first word storage unit and from said other regional buffer for transfer of the inquiry words from both regional buffers to the switching unit output, empty word means for generating an empty word having no customer unit address, and a second switching unit having an output connected to said one regional buffer and having the output of said second word storage unit connected as one input and said empty word means connected as another input and including means for alternately selecting words from said second word storage unit and from said empty word means for transfer of message words from said second word storage unit to said one regional buffer only during one of said even and odd time slots.

7. In a market quotation apparatus having a memory unit including means for storing market information therein, a computer including means for looking up stored information in the memory unit and composing a message in response to an inquiry, the inquiry including an identification section and a function section, a plurality of customer units, each including means for generating an inquiry and means for displaying a message, first and second regional buffers, each having a plurality of customer inputs and outputs and a high speed line input and output, means for connecting customer units to the corresponding input and output of predetermined regional buffers for transmitting inquiries to a regional buffer and messages to a customer unit, and a computer buffer having a high speed line input and output and a computer input and output for connection to the computer, with the inquiries and messages being transmitted between regional and computer buffers bit by bit in the form of digital words grouped into transmission frames with each frame having even and odd time slots and a synchronizing frame indicator time slot, each word having an address and a character, the improvement comprising means for connecting the first and second regional buffers to an input and output of the computer buffer for transmitting inquiries to the computer buffer and messages to the first and second regional buffers, and with the first regional buffer transmitting inquiries only in the even time slots and with the second regional buffer transmitting inquiries only in the odd time slots, and with each regional buffer transmitting empty words having no customer unit address when no inquiry is available for transmission, and including in combination:

first and second word storage units, a first gate unit connected between one of said regional buffers and said first word storage unit and including means for passing words from said one regional buffer to said first word storage unit during one of said even and odd time slots and rejecting words during the other of said time slots, first control means having the address of a word in said first word storage unit as an input for recognizing the presence of an empty word and blocking transfer of such empty word from said first word storage unit, a second gate unit having an input connected to said computer buffer output and having odd and even outputs and including means for passing odd words from said computer buffer to said odd output and even words from said computer buffer to said even output and with the corresponding one of said odd and even outputs connected to said other regional buffer and the other of said odd and even outputs connected to said second word storage unit, second control means having the address of a word in said second word storage unit as an input for recognizing the presence of an empty word and blocking transfer of such empty word from said second word storage unit, empty word means for generating an empty word having no customer unit address, a first switching unit having an output connected to said computer buffer and having the output of said first word storage unit connected as one input and said other regional buffer connected as another input and said empty word means as another input and including means for alternately selecting words from said first word storage unit and from said other regional buffer for transfer of the inquiry words from both regional buffers to the switching unit output and for selecting empty words from said empty word means in lieu of words from said first word storage unit when there is no inquiry word available in said first word storage unit, and a second switching unit having an output connected to said one regional buffer and having the output of said second word storage unit connected as one input and said empty word means connected as another input and including means for alternately selecting words from said second word storage unit and from said empty word means for transfer of message words from said second word storage unit to said one regional buffer only during one of said even and odd time slots and for selecting empty words from said empty word means in lieu of words from said word storage unit when there is no message word available in said second word storage unit during said one of said even and odd time slots.

No references cited.

ROBERT C. BAILEY, *Primary Examiner.*

R. B. ZACHE, *Assistant Examiner.*